(12) United States Patent
Robl et al.

(10) Patent No.: US 9,134,151 B2
(45) Date of Patent: Sep. 15, 2015

(54) METHOD FOR OPERATING A SENSOR IN A MULTISENSOR SYSTEM, ESPECIALLY IN A FIELD DEVICE IN THE FORM OF A MEASURING DEVICE FOR PROCESS AUTOMATION TECHNOLOGY, AND SENSOR FOR PERFORMING THE METHOD

(75) Inventors: Stefan Robl, Gerlingen (DE); Thomas Al-Ber, Stuttgart-Vaihingen (DE)

(73) Assignee: Endress + Hauser Conducta Gesellschaft für Mess-und Regeltechnik mbH + Co. KG, Gerlingen (DE)

( * ) Notice: Subject to any disclaimer, the term of this patent is extended or adjusted under 35 U.S.C. 154(b) by 668 days.

(21) Appl. No.: 13/395,953

(22) PCT Filed: Aug. 17, 2010

(86) PCT No.: PCT/EP2010/061937
§ 371 (c)(1),
(2), (4) Date: Mar. 14, 2012

(87) PCT Pub. No.: WO2011/032794
PCT Pub. Date: Mar. 24, 2011

(65) Prior Publication Data
US 2012/0173178 A1   Jul. 5, 2012

(30) Foreign Application Priority Data
Sep. 16, 2009   (DE) ...................... 10 2009 029494 U

(51) Int. Cl.
*G05B 19/042* (2006.01)
*G01D 21/00* (2006.01)
*G01D 3/08* (2006.01)

(52) U.S. Cl.
CPC .................. *G01D 21/00* (2013.01); *G01D 3/08* (2013.01); *G05B 19/042* (2013.01); *G05B 2219/25428* (2013.01)

(58) Field of Classification Search
CPC .................................................... G05B 19/0426
USPC ........................................................... 702/62
See application file for complete search history.

(56) References Cited

U.S. PATENT DOCUMENTS

| 7,231,283 | B2 | 6/2007 | Maier |
| 2003/0184447 | A1 | 10/2003 | Otterbach |

(Continued)

FOREIGN PATENT DOCUMENTS

| DE | 10114504 A1 | 3/2001 |
| DE | 10155189 A1 | 11/2001 |

(Continued)

OTHER PUBLICATIONS

English translation of IPR, Jul. 3, 2003, WIPO, Geneva.

*Primary Examiner* — Bryan Bui
(74) *Attorney, Agent, or Firm* — Bacon & Thomas, PLLC

(57) ABSTRACT

A method for operating a sensor in a multisensor system, especially in a field device in the form of a measuring device for process automation technology, wherein data output from the sensor are evaluated by the measuring device connected with the sensor and the measuring device supplies the sensor with energy. In order reliably to limit production of lost heat in a measuring device to a certain value and, in spite of this, to be able to connect a number of sensors with different energy requirements to a measuring device, before a startup of the sensor, it is checked whether, with startup of the sensor, a maximum consumption of electrical energy of the measuring device would be exceeded.

29 Claims, 1 Drawing Sheet

(56) References Cited

U.S. PATENT DOCUMENTS

| | | |
|---|---|---|
| 2004/0059468 A1 | 3/2004 | Derr |
| 2005/0070176 A1* | 3/2005 | Joegel et al. ............... 439/874 |
| 2006/0155511 A1 | 7/2006 | Steinmueller |
| 2008/0218333 A1 | 9/2008 | Hedtke |
| 2009/0031152 A1 | 1/2009 | Bolderl-Ermel |
| 2012/0179423 A1* | 7/2012 | Robl ............... 702/188 |

FOREIGN PATENT DOCUMENTS

| | | |
|---|---|---|
| DE | 10239610 B3 | 8/2002 |
| DE | 10114504 A1 | 10/2002 |
| DE | 10155189 | 7/2003 |
| DE | 102 39610 B3 | 6/2004 |
| DE | 10 2004048155 | 4/2006 |
| DE | 102006036770 A1 | 8/2006 |
| DE | 102006046243 A1 | 9/2006 |
| DE | 102007047309 A1 | 2/2007 |
| DE | 10 2006036770 | 2/2008 |
| DE | 102006046243 A1 | 4/2008 |
| DE | 102007047309 | 4/2009 |
| WO | 2008108841 A1 | 12/2007 |
| WO | WO 2008/037517 A2 | 4/2008 |
| WO | WO 2008/108841 | 9/2008 |
| WO | WO2009/047194 A1 | 4/2009 |
| WO | 2011032794 A2 | 8/2010 |

\* cited by examiner

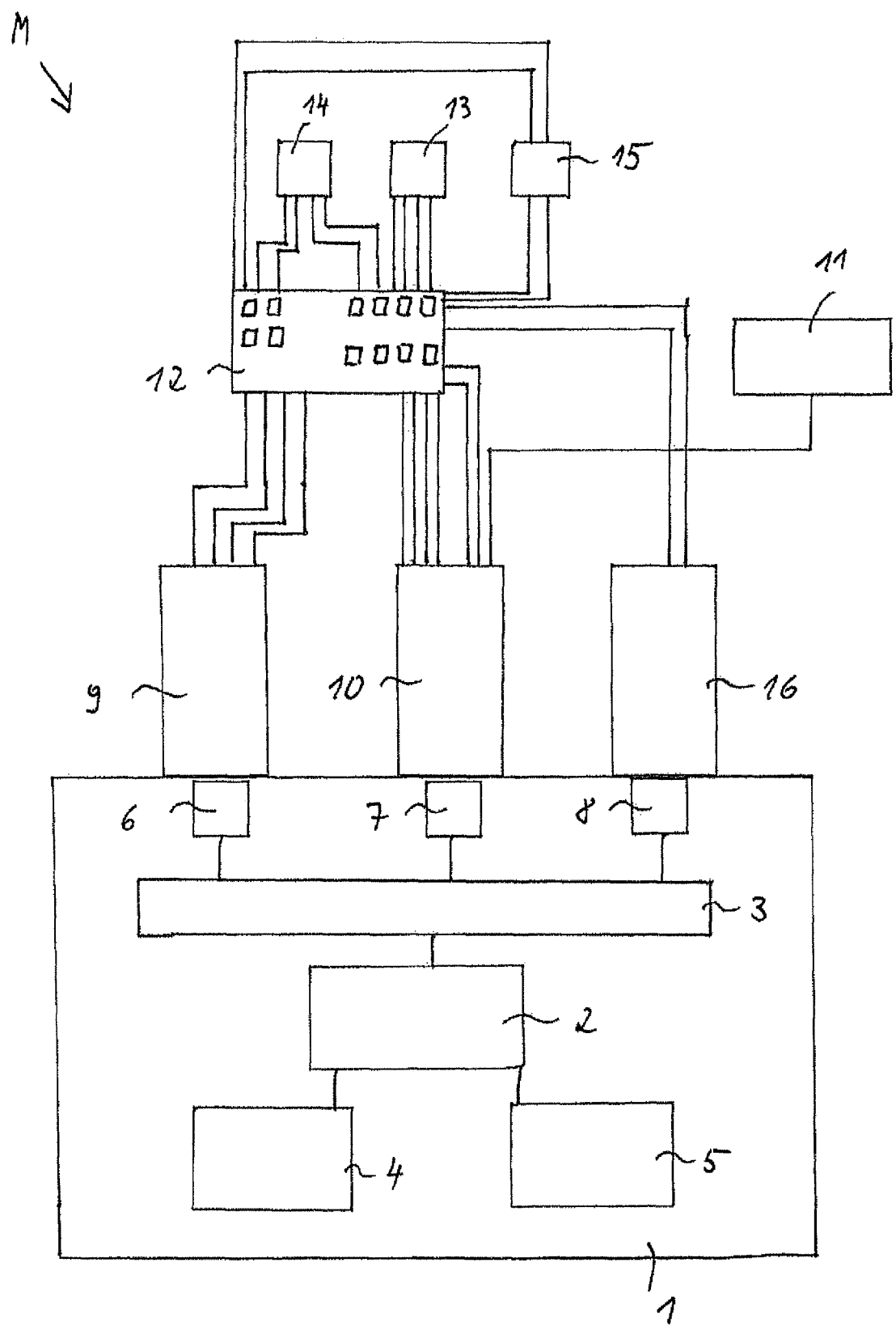

METHOD FOR OPERATING A SENSOR IN A MULTISENSOR SYSTEM, ESPECIALLY IN A FIELD DEVICE IN THE FORM OF A MEASURING DEVICE FOR PROCESS AUTOMATION TECHNOLOGY, AND SENSOR FOR PERFORMING THE METHOD

TECHNICAL FIELD

The invention relates to a method for operating a sensor in a multisensor system, especially in a field device in the form of a measuring device for process automation technology, wherein data output from the sensor are evaluated by the measuring device connected with the sensor and the measuring device supplies the sensor with energy, as well as sensor for use in a multisensor system, especially for process automation technology.

BACKGROUND DISCUSSION

In process automation technology, one works with many different sensors. Thus, there are sensors, which sense fill level, conductivity, pressure, temperature, angular setting (e.g. on a machine) or pH value, as well as applications such as optical sensors, e.g. turbidity sensors or absorption sensors. Also ionsensitive sensors are applied, which sense, among other things, the nitrate content of a liquid. Each sensor is connected, in such applications, to an interface, which, in turn, is connected with a processor, which evaluates and further processes the sensor signals. In a field device, in which the processor and other active electronics are arranged, there are, most often, a number of plugin locations present, wherein, in each case, one sensor is connectable to one plugin location. Thus, also a plurality of sensors can be connected to a field device and supplied by such with electrical energy.

The field device can, however, only implement a limited consumption of electrical energy, since the energy consumption within the field device leads to a power loss in the electrical assemblies and components, which is given off as heat. Since the hermetically sealed field device can only give off a certain amount of heat to the environment, the heat remaining in the field device leads to an impermissible temperature rise of the assemblies. This can progress so far that assemblies are destroyed by the temperature rise and the field device becomes non functional.

SUMMARY OF THE INVENTION

An object of the invention, thus, is to provide a method for operating a sensor in a multisensor system and a sensor therefor, in the case of which a production of lost heat in a measuring device is reliably limited to a certain value, and, in spite of this, a number of sensors with different energy requirements can be connected to the measuring device.

According to the invention, the object is achieved by the feature that, before a startup of the sensor, it is checked whether, with startup of the sensor, a maximum consumption of electrical energy of the measuring device would be exceeded. This has the advantage that the measuring device is not overloaded as regards the electrical power, which the measuring device can provide. The measuring device ascertains, automatically, whether the sensor is compatible with the energy balance of the measuring device. A user of the measuring device can, thus, avoid having itself to perform such an analysis. If the electrical power, which a sensor supplementally connected to the measuring device requires, is too high, this is signaled to the user by the measuring device, so that the user can elect not to connect the sensor to the measuring device. If the power lies within the energy level, which the measuring device can provide, the measuring device provides the energy, which the sensor requires.

Advantageously, before startup of the sensor, the energy consumption of all electrical assemblies operated in the measuring device is ascertained and the energy consumption ascertained, including the energy consumption of the sensor, is compared with the maximal energy consumption of the measuring device, wherein, in the case of a subceeding, or falling beneath, or equaling of the maximal energy consumption, the sensor is placed in operation. In this way, it can be determined very simply and rapidly, whether the sensor newly to be connected leads to an overloading of the measuring device.

In an embodiment, the sensor is connected with the measuring device and then supplied with a predetermined electrical energy by the measuring device.

In a further development, the predetermined electrical energy is less than the energy necessary for normal operation of the sensor. In this way, it is reliably prevented that the measuring device enters into overload operation just by the mere connecting of the sensor, even though the sensor is still not operably connected.

Advantageously, the measuring device communicates with the sensor, with the sensor reporting to the measuring device its energy consumption needed for operation. The energy required for operation of the sensor is stored in the sensor. Through the transmission of the energy consumption by the sensor, a measuring of the same during normal operation of the sensor is not necessary and so the sensor does not have to be placed in normal operation for obtaining this information.

In an embodiment, the sensor forwards to the measuring device information concerning the type of the sensor, and that characterizes the energy consumption of the sensor. The measuring device has information concerning all types of sensors contemplated for connection to the measuring device. Thus, information concerning the type of sensor is completely sufficient and the measuring device can draw conclusions concerning the energy requirement of the sensor from the information stored in the measuring device.

Alternatively, the sensor sends its energy consumption to the measuring device directly.

In another form of embodiment, in the case of an exceeding of the maximal energy consumption of the measuring device, information concerning such is output, such that the sensor will not be put in operation. Through this information, an interaction with the user is introduced, who, because of this report, no longer has to ascertain alone, whether the sensor can be placed in operation. Calculation work, which the user had to perform before this invention, in order to ascertain, whether the energy consumption of the new sensor still fits into the power balance of the measuring device, can be omitted.

In a further development, the information is output optically and/or acoustically. This enables a simple guiding of the user.

In a variant, in the case of exceeding the maximal energy consumption of the measuring device, two or more sensors are operated one after the other. This form of embodiment is always especially of advantage, when a plurality of sensors are absolutely required, in order to fulfill a measurement task, even though their connection to the measuring device leads to an overloading as regards the energy balance of the measuring device. Since at a certain point in time, however, always only one of the high energy sensors is connected, the energy balance of the measuring device remains undisturbed. In an embodiment, the two or more sensors are operated alternately. In this way, it is assured that all high energy sensors become active in a predetermined rhythm for the measurement operation.

Advantageously, a cleaning phase of the sensor occurs after startup of the sensor. Since measurements in turbid liquids, as is the case, for example, in clarification plants, can lead to a fouling of the sensor, it is necessary that the sensor be cleaned in certain time intervals, since otherwise the liquid, which should be examined in a measurement, can no longer access the measuring surface of the sensor. This is especially important in the case of optical sensors, since the measuring surface is degraded in its function when a deposit is present thereon.

In an embodiment, the measuring device triggers the cleaning phase of the sensor. In the measuring device, especially in the central processor, control programs are provided, which in determined intervals activate the output of pressurized air or a cleaning liquid, in order to clean the measuring surface of the sensor. Thus, the measuring device can initiate a cleaning phase, when the measured values, which the sensor delivers, subceed or exceed a certain limit value and, consequently, are judged as not realistic.

Alternatively, the cleaning phase is triggered as a function of time. Thus, it is assured that the measuring surface of the sensor is cleaned at regular intervals, so that the measured values of the sensor are kept accurate. How long the cleaning takes depends on the degree of fouling of the sensor and on the measuring method used.

In a further development, the sensor is informed of the beginning and/or the end of the cleaning phase. This is important, in order that the sensor can discontinue its measurement activity during this period of time.

Advantageously, the last measured value produced before beginning the cleaning phase of the sensor is stored and processed further after the end of the cleaning phase. Such a procedure is always advantageous, when the measuring cycle of the sensor is relatively short, so that it is to be assumed therefrom, that the measured value is always still representative after termination of the cleaning procedure, since the measured medium has changed in the meantime only insignificantly.

In an embodiment, an alarm or an error report is triggered by the measuring device at the beginning of the cleaning phase. In this way, it is made evident that the measured values output at this point in time are burdened with error.

In another variant, the last measured value is frozen by the sensor and/or the measuring device for the duration of the cleaning phase. Alternatively, the sensor and/or the measuring device issues during the cleaning phase a fixed measured value or a measured value predetermined by the user.

In a further development, after the beginning of the cleaning phase, all signal processing values in the measuring device are deleted, and, after termination of the cleaning phase, the sensor delivers measured values, from which new signal processing values are generated. In this way, it is assured that also signal processing is discontinued in the measuring device during the cleaning phase of the sensor.

Advantageously, signal processing values, which were processed before the beginning of the cleaning phase, are used for further processing after termination of the cleaning phase.

Alternatively, the signal processing values are discarded after terminating the cleaning phase and the signal processing starts all over again.

In an embodiment, the sensor decides when the cleaning phase begins. These are intelligent sensors, which examine the measured values provided by them for plausibility. If such plausibility is not found, it is assumed that the sensor is fouled and so a cleaning phase introduced.

Advantageously, the sensor informs the measuring device concerning the beginning and/or termination of the cleaning phase. This step is necessary, in order that the measuring device discontinues the processing of the measuring signals during the cleaning procedure. Depending on applied measuring—and evaluation method, the signal processing values are either stored and processed further after terminating the cleaning phase or they are discarded and generated anew upon resumption of measurement operation.

Another further development of the invention relates to a sensor for use in a multisensor system, especially in process automation technology, wherein systemproperties are stored in the sensor. In order to connect sensors with different electrical power consumptions into a multisensor system, the system property relates to at least one state of the sensor. The sensor must know this state, in order to be able to communicate with the measuring device. In such case, the sensors can work with the most varied of protocols and transmission rates.

Advantageously, the state includes the energy requirement of the sensor. The sensor can, thus, report its energy requirement to a multisensor system at any time, without that a user must measure this energy requirement. Therewith, it is assured that always the right energy supply of the sensor is guaranteed.

In an embodiment, the state comprising the energy requirement of the sensor includes a startup function. For performing this startup function, a lowered energy requirement is necessary compared with normal operation. Through the storing of such information in the sensor, it is assured that the sensor reacts to such a lowered energy value.

In a further development, the startup function includes communication with the measuring device at an energy level, which is less than the energy level, which the sensor requires for normal operation. The startup function, thus, inserts before the actual normal operation of the sensor a method step, in which other demands are placed on the sensor than in normal operation.

Advantageously, the state includes a cleaning function of the sensor. In the case of activating the cleaning function, the sensor must adjust its measurement operation thereto.

In a form of embodiment, the cleaning function interrupts a measuring function of the sensor, so that no measured values are delivered during the cleaning.

In another form of embodiment the cleaning function and the measuring function of the sensor are executed simultaneously. In such case, it can be decided based on the measured values, whether the cleaning can be terminated or must still be performed. Thus, the duration of the cleaning is controlled by evaluation of these measured values.

In a further development, the cleaning function of the sensor characterizes the validity, or invalidity, of the measured values output during the cleaning phase.

Advantageously, the sensor associates with each measured value a status value, depending on whether the measured value is true or false.

BRIEF DESCRIPTION OF THE DRAWINGS

The invention permits numerous forms of embodiment. One such embodiment will now be explained in greater detail based on the drawing, the sole FIGURE of which shows as follows:

FIG. 1 is a schematic diagram of a measurement transmitter than field device in process automation technology.

DETAILED DISCUSSION IN CONJUNCTION WITH THE DRAWINGS

FIG. 1 shows a measurement transmitter T, which includes a base block 1 and which is embodied as a circuit board, on which are arranged all active components, such as, for example, a processor 2, an I/O controller 3, a flash memory 4 and a working memory 5. Base block 1 includes furthermore three plugin locations 6, 7, 8, wherein secured to the plugin location 6 is a power supply 9 for electrical current supply of the measurement transmitter M. Power supply 9 provides, in such case, a voltage of 24 V. Connected at plugin location 7 is a base module 10, on which connections for two sensors are provided, which are connected with the base module 10 via cable. Furthermore, the base module 10 leads to a display 11, which is embodied for display and as a servicing module and can only represent graphical data and evaluate inputs. The third plugin location 8 on the base block 1 is freely available and can accommodate any expansion circuit.

Base module 10 and the power supply 9 are each arranged on a circuit board, which are embodied as plugin cards and are inserted perpendicularly into contact slots provided on the base block 1. On the other side, the plugin cards of the power supply 9 and of the base module 10 are connected with a contact plate 12, in which connections for the external sensors 13, 14 are provided. Each sensor 13, 14 requires two connections for data transmission and two connections for the energy supply. The sensor 13 is connected via the four connectors, which it occupies, with the base module 10, which provides a power of a few mW for the operation of the sensor 13. Thus, sensor 13 is a sensor with a low energy requirement.

Sensor 14, in contrast, is a high energy sensor, which for its operation requires an electrical power of, for example, 5 W. For this reason, sensor 14 is connected with two energy connectors, which lead directly to the power supply 9 of the measurement transmitter M, while the two connections required for data communication are connected to the base module 10.

If it is necessary for the present measurement task of the measurement transmitter M to connect an additional high energy sensor 15, such is connected via another plugin card 16 to the plugin location 8. Plugin card 16 is also connected with the contact plate 12, so that the high energy sensor 15 is connected with two connections for data transmission and with two additional connections to the plugin card carrying the power supply 9. The base block 1 can be expanded by an expansion block, to which can be connected other, not shown plugin cards for sensors, actuators or other circuits.

In the case of the mentioned sensors 13, 14, 15, these are intelligent digital sensors. Each sensor 13, 14, 15 has available, besides its normal measuring function, a startup function and a cleaning function. The startup function enables the high energy sensor 14 or 15, when given an electrical power of, for example, 100 mW, to communicate. Measurement operation is not possible at this power level.

Measurement operation requires, for example, in the case of the high energy sensors 14, 15, a power of 5 W or 7 W.

A cleaning function of the sensor 13, 14 or 15 cares for turning off the measurement procedure of the sensor, when the sensor receives a signal, that a cleaning phase is to be initiated.

In the case of installation of the new, high energy sensor 15, procedure is as follows. The high energy sensor 15 is connected in the described manner with two lines to the power supply 9 and two lines to the plugin card 16. In startup of the high energy sensor 15, it is fed a maximum power of 100 mW, so that only communication with the processor 2 is possible. The high energy sensor 15 is now queried by the processor 2, which electrical current, i.e. which power, it requires for its normal operation. The processor 2 receives this information in the form of identification of the sensor type. The processor 2 ascertains, based on information concerning electrical current, the electrical power of the sensor 15. Under assessment of all expansion cards arranged in the measurement transmitter, processor 2 then determines, which heat is produced by these electronic circuits taking into consideration the high energy sensor 15 to be connected newly into the measurement transmitter M enclosed in a housing. The highest value of the heat is limited to 7 W, since no higher heat exchange is possible through the housing. A higher value of heat lost from electronic, or electrical, circuits within the housing would lead to an overheating of the circuits and degrade the operation of the measurement transmitter M. If the processor 2 establishes that the highest value of 7 W for the allowed lost heat is exceeded with connection of the new high energy sensor 15, a signal is output via the display 11 to the user of the measurement transmitter M that the sensor 15 cannot be operated. Through such a user interaction, the user is informed, whether the high energy sensor 15 can be operated. At the same time, the user receives, however, also information concerning how much exploitable power is still available, so that the user can find and connect a sensor with a suitable power demand.

If there is, however, a compelling necessity that the high energy sensor 15 be connected, in spite of an exceeding of the upper limit on heat energy, then this new sensor 15 is operated alternately with the already connected sensor 14. In this way, it is assured that the upper limit on produced heat energy is not exceeded.

If the sensor 13, 14 or 15 has been in normal operation, through fouling of the sensor, it frequently can happen that the medium to be evaluated, such as, for example, a liquid, cannot reach the active area of the sensor, which, then, fails to output plausible sensor values. For this reason, the sensor 13, 14 or 15 is subjected to a cleaning phase, either at regular intervals or through decision of the sensor. In such a cleaning phase, the sensor 13, 14 or 15 is cleaned, either by means of pressurized air or a cleaning liquid.

In order to avoid that the sensor 13, 14 or 15 outputs during the cleaning phase incorrect measured values, which can easily happen, for example, during a determining of the average the measured values during the cleaning phase, there are two options, as is done with the measured values during the cleaning.

The first option is to store the last measured value, which was measured before the beginning of the cleaning phase, and to process it further after the termination of the cleaning phase together with the newly measured; measured values. To this end, the sensor 13, 14 or 15 must be told the beginning and the end of the cleaning procedure, in order that the storing of the sensor value as well as its subsequent release by the sensor 13, 14 or 15 can occur at suitable points in times. This information receives the sensor 13, 14 or 15 of the processor 2.

The second option is the output of an error report, coupled with an alarm, in order to announce that the measured values are not realistic.

In the case of a third option, the sensor 13, 14, 15 and/or the processor 2 during the cleaning phase freezes the last measured value for the duration of the cleaning phase.

A fourth option is that, during the cleaning phase, the sensor 13, 14, 15 or the processor 2 outputs a fixed measured value or a measured value predetermined by the user.

Also the processor 2 of the measurement transmitter must be set to whether the sensor 13, 14 or 15 ascertains new measured values after the cleaning phase or retrieves the old measured values. As a function of how long the cleaning takes, or which measuring method is being used, it is decided what happens with the signal processing values of the processor 2. These can be completely discarded or further processed in the case of short cleaning phases.

If the sensor 13, 14 or 15 is an intelligent sensor, which decides, whether a cleaning is to be performed, the sensor 13, 14 or 15 transmits to the processor 2, at start and finish of the cleaning phase, a signal, which informs the processor 2 concerning the cleaning phase, whereby the processor 2 decides what should be done with the signal processing values.

The invention claimed is:

1. A method for operating a sensor in a multisensor system, especially in a field device in the form of a measuring device for process automation technology, comprising the steps of:
   evaluating data output from the sensor by the measuring device connected with the sensor;
   supplying energy with the measuring device to the sensor;
   before start-up of the sensor, it is checked whether, with start-up of the sensor, a maximum consumption of electrical energy of the measuring device would be exceeded;
   ascertaining, before start-up of the sensor, the energy consumption of all electrical assemblies operated in the measuring device; and
   comparing the energy consumption ascertained, including the energy consumption for the sensor to be placed in operation, with the maximal energy consumption of the measuring device, wherein:
   in the case of a subceeding or equaling of the maximal energy consumption, the sensor is placed in operation; and
   a cleaning phase of the sensor occurs after start-up of the sensor.

2. The method as claimed in claim 1, wherein:
the sensor with the measuring device is connected and then supplied with a predetermined electrical energy by the measuring device.

3. The method as claimed in claim 2, wherein:
the predetermined electrical energy is less than the energy necessary for normal operation of the sensor.

4. The method as claimed in claim 2, wherein:
the measuring device communicates with the sensor and the sensor reports to the measuring device its energy consumption needed for operation.

5. The method as claimed in claim 4, wherein:
the sensor forwards to the measuring device information concerning the type of the sensor; and
the information is characteristic of the energy consumption of the sensor.

6. The method as claimed in claim 1, wherein:
the sensor reports its energy consumption to the measuring device directly.

7. The method as claimed in claim 1, wherein:
in the case of an exceeding of the maximal energy consumption of the measuring device, information concerning such is output, such that the sensor will not be put in operation.

8. The method as claimed in claim 7, wherein:
the information is output optically and/or acoustically.

9. The method as claimed in claim 1, wherein:
in the case of exceeding the maximal energy consumption of the measuring device, two or more sensors are operated one after the other.

10. The method as claimed in claim 9, wherein:
the two or more sensors are operated alternately.

11. The method as claimed in claim 1, wherein:
the measuring device triggers the cleaning phase of the sensor.

12. The method as claimed in claim 1, wherein:
the cleaning phase is triggered as a function of time.

13. The method as claimed in claim 1, wherein:
the sensor is informed of the beginning and/or the end of the cleaning phase.

14. The method as claimed in claim 1, wherein:
the last measured value produced before beginning the cleaning phase of the sensor is stored and processed further after the end of the cleaning phase.

15. The method as claimed in claim 1, wherein:
an alarm or an error report is triggered by the measuring device at the beginning of the cleaning phase.

16. The method as claimed in claim 1, wherein:
the sensor and/or the measuring device during the cleaning phase freeze(s) the last measured value for the duration of the cleaning phase.

17. The method as claimed in claim 1, wherein:
the sensor and/or the measuring device issue(s) during the cleaning phase a fixed measured value or a measured value predetermined by the user.

18. The method as claimed in claim 1, wherein:
after the beginning of the cleaning phase, all signal processing values in the measuring device are deleted, and, after termination of the cleaning phase, the sensor delivers sensor values, from which new signal processing values are generated.

19. The method as claimed in claim 1, wherein:
signal processing values, which were processed before the beginning of the cleaning phase, are used for further processing after termination of the cleaning phase.

20. The method as claimed in claim 1, wherein:
the sensor decides when the cleaning phase begins.

21. The method as claimed in claim 20, wherein:
the sensor informs the measuring device concerning the beginning and/or termination of the cleaning phase.

22. A sensor for use in a multisensor system, especially in a field device in the form of a measuring device process automation technology, in which system properties of the sensor are stored, wherein:
   the system property relates to at least one state of the sensor;
   the energy consumption of all electrical assemblies operated in the measuring device is ascertained before start-up of said sensor;
   the energy consumption ascertained, including the energy consumption for said sensor to be placed in operation, is compared with the maximal energy consumption of the measuring device;
   in the case of a subceeding or equaling of the maximal energy consumption, said sensor is placed in operation; and
   said at least one state includes a cleaning function of said sensor.

23. The sensor as claimed in claim 22, wherein:
the state comprises the energy requirement of the sensor.

24. The sensor as claimed in claim 23, wherein:
the state comprising the energy requirement of the sensor includes a start-up function.

25. The sensor as claimed in claim 24, wherein:
the start-up function includes communication with the measuring device at an energy level, which is less than the energy level, which the sensor requires for normal operation.

26. The sensor as claimed in claim 22, wherein:
the cleaning function interrupts a measuring function of the sensor.

27. The sensor as claimed in claim 22, wherein:
the cleaning function and the measuring function of the sensor are executed simultaneously.

28. The sensor as claimed in claim 22, wherein:
the cleaning function of the sensor characterizes the validity, or invalidity, the measured values output during the cleaning phase.

29. The sensor as claimed in claim 28, wherein:
the sensor associates a status value with each measured value.

\* \* \* \* \*